Oct. 15, 1957  G. WOOD  2,809,655

BOILER FEED REGULATOR VALVES

Filed April 1, 1955

Inventor:
George Wood

United States Patent Office 2,809,655
Patented Oct. 15, 1957

2,809,655

BOILER FEED REGULATOR VALVES

George Wood, London, England, assignor to Vickers-Armstrongs Limited, London, England, a British company Application April 1, 1955, Serial No. 498,671

Claims priority, application Great Britain April 2, 1954

11 Claims. (Cl. 137—393)

This invention relates to regulator valves for controlling the supply of feed water to a boiler and has for a main object to facilitate the maintenance of water in the boiler as near as possible to the required working level, particularly during changes in the rate of evaporation.

Accordingly the invention provides a boiler feed regulator valve wherein a valve member having two opposed heads is arranged for axial movement in a valve chamber to control communication, through said chamber, between a feed water supply and a boiler, the outwardly facing surfaces of said valve member heads being disposed for subjection respectively to said supply pressure and to pressure prevailing in a balance chamber, whilst the facing surfaces of said heads are subjected to the boiler pressure, and wherein means is provided for automatically varying the pressure in said balance chamber in dependence upon the water level in the boiler to determine the axial disposition of said valve member.

Figure 1:
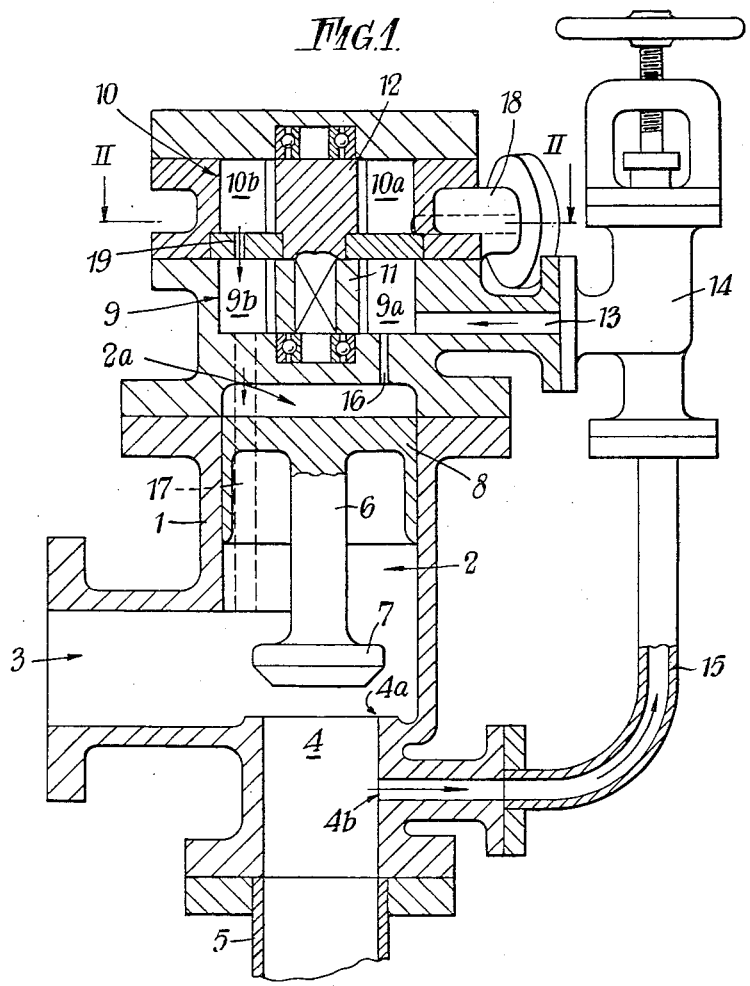
Figure 2:
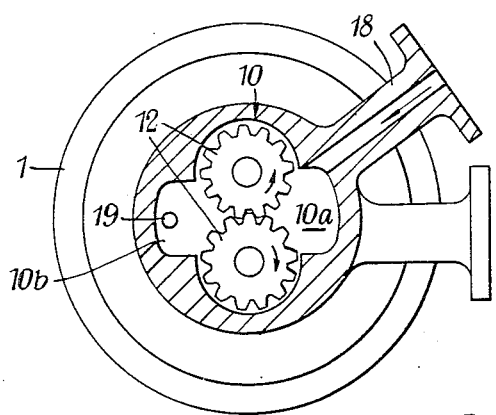

In order that the invention may be clearly understood and readily carried into effect, an embodiment thereof will now be described in detail with reference to the accompanying drawings, in which, Figure 1 is a part sectional side elevation showing one form of feed regulator valve in accordance with the invention, and Figure 2 is a section on the line II—II of Figure 1.

Referring now to the drawings, the regulator valve is contained within a casing 1 which defines an internal cylindrical chamber 2 opening at one end into two passages 3 and 4, the passage 3 being adapted for communication with an inlet to a boiler steam drum, whilst the passage 4 is adapted for communication with the discharge conduit 5 of a feed water pump. These two passages 3 and 4 are conveniently at right angles to one another, the feed pump discharge passage 4 being in axial alignment with the chamber 2.

Within the chamber 2 a composite valve member is arranged for axial reciprocation, this valve member being constituted by a valve rod 6 having two opposed heads 7 and 8, the head 8 being in the form of an enlarged piston. The valve head 7 is arranged to co-operate with a seating 4a at the junction of the chamber 2 and feed pump discharge passage 4 so as to control the supply of feed water through this passage into the chamber and thence through the passage 3 to the boiler inlet. The piston 8 on the opposite end of the valve rod 6 is preferably skirted and is dimensioned to provide a close working fit within the valve chamber 2. The portion 2a of the valve chamber 2 above the piston 8 then constitutes a balance chamber the function of which will later become clear.

Provided in the valve casing above the balance chamber 2a are two further superposed compartments 9 and 10 respectively containing a gear motor 11 and a gear pump 12, coaxially arranged and of similar dimensions, the motor 11 being arranged to drive the pump 12. The inlet side 9a of the compartment containing the motor 11 is in communication, through a branch passage 13, an adjustable valve 14 and a further branch passage 15, with the feed pump discharge passage 4 at a point 4b in the said passage between the feed pump and valve head 7. The motor 11 can thus be driven by the pressure of the feed water which flows into the inlet side 9a of the motor compartment 9 through the passage 15, valve 14 and passage 13. This inlet side 9a of the motor compartment is also permanently in communication through a narrow bore passage 16, with the balance chamber 2a above the piston. The discharge side 9b of the motor compartment 9, is, on the contrary, permanently in communication, through a wider bore passage 17, with the chamber 2 below the piston 8 and thus also with the boiler drum through the passage 3 leading to the boiler inlet.

The gear pump 12, which, as aforesaid, is driven by the motor 11, has the inlet side 10a of its compartment 10 connected with the boiler steam drum through an inlet passage 18 and a conduit not shown, the latter opening into the boiler drum at a position corresponding to the liquid working level of the drum. The discharge side 10b of the gear pump compartment 10 is connected through a restricted bore 19 with the discharge side 9b of the motor compartment, the latter as previously stated, being in communication through the valve chamber with the boiler steam drum. Alternatively, the discharge side 10b of the gear pump may be connected to the boiler steam drum at a position above the liquid working level of the drum.

In the arrangement described, the speed of rotation of the gear pump 12 is determined by the nature or state of the fluid which flows into the inlet side 10a of the gear pump compartment 10 from the boiler. When the boiler level is high, it is water that flows in and the resistance offered by the restricted bore 19 opening from the discharge side 10b of the pump compartment to the discharge side 9b of the motor compartment restrains the pump speed to a minimum. This restraint is, of course, also applicable to the motor 11, which is coupled with the gear pump as aforesaid. Conversely, when the boiler water level is low, steam flows into the inlet side 10a of the gear pump compartment whereupon the reduced resistance to discharge through the restricted bore 19 from the upper compartment allows the gear pump 12, and thus also the motor 11, to attain a maximum speed.

When the speed of the motor 11 is low, the inlet pressure is maintained at a high value and results in a comparatively high pressure in the balance chamber 2a which, as aforesaid, is permanently in communication with the inlet side 9a of the motor compartment. Conversely, when the speed of the motor 11 is high, the inlet pressure in the motor compartment falls and in consequence the pressure in the balance chamber 2a is reduced. The extent of pressure change in the balance chamber 2a can be readily determined to ensure that the higher pressure will be more than sufficient to close the valve and shut off the feed water supply to the drum, whilst the lower pressure is below the resistance point at which the valve can be opened by the feed supply pressure acting thereon.

To give a specific example of pressures prevailing during the functioning of the regulator valve, it may be assumed that the feed pump discharge pressure to the boiler is 400 lbs. per sq. inch below the valve head 7 whilst the boiler pressure prevailing above the valve head 7 and below the piston 8 is 300 lbs. per sq. inch. If now the regulator valve 14 in the branch passages between the feed pump discharge and motor inlet is opened to allow the feed pump pressure to fall to 397 lbs. per sq. inch, this pressure drop of 3 lbs. per sq. inch will pass 24 lbs. of water per minute into the motor compartment inlet and this quantity of water flowing through the motor will rotate it at 132 R. P. M. The pressure in the balance chamber 2a will, of course, now equal 397 lbs. per sq. inch which is the pressure on the inlet side 9a of the motor, whilst the pressure on the discharge side of the motor will equal 300 lbs. per sq. inch since this discharge side is in communication with the boiler drum. Since the motor 11 and the gear pump 12 have similar dimensions, the torque exerted on the motor 11 by the flow of water from the feed pump discharge will be transmitted to the gear pump 12 and produce the same pressure difference between the inlet and discharge sides of this pump i. e. 97 lbs. per sq. inch. Since the gear pump rotates with the motor, the pump will suck in 24 lbs. of water per minute from the boiler, assuming that the boiler water level is high, and deliver it to the discharge side 10b of the pump at a pressure of 397 lbs. per sq. inch. In consequence there will be a pressure difference of 97 lbs. per sq. inch between the discharge sides 10b and 9b respectively of the gear pump and motor compartments, which, as aforesaid are in communication through bore 19. The restricted nature of this bore 19 is, however, such that it is designed to pass 24 lbs. of water per minute with a pressure difference of 97 lbs. per sq. inch and in consequence the regulating valve is balanced with a pressure of 397 lbs. per sq. inch in the balance chamber 2a. The dimensions of the working parts are such that this pressure produces a resultant force of 1740 lbs. tending to close the valve. If, however, the water level in the boiler is low and steam flows into the inlet side 10a of the gear pump, assuming the adjustable valve 14 to be in the same position as in the foregoing example, the resistance offered by the gear pump 12 is now considerably reduced resulting in the speeding up of the motor and pump and the flow of water into the inlet side 9a of the motor being increased to 121 lbs. per minute. This quantity of water passing through the motor 11 drives it at a speed of 684 R. P. M. and consequently the gear pump 12 also runs at 684 R. P. M. with the result that the pressure of the steam pumped thereby is increased from 300 lbs. per sq. inch to 320 lbs. per sq. inch. At this pressure the quantity of steam flowing through the restricted bore 19 into the discharge side 9b of the motor is 1.35 lbs. per minute and the volume of this quantity of steam corresponds to the displacement of the pump 12 when running at a speed of 684 R. P. M. The pressures on the inlet and discharge sides of the gear pump being 300 and 320 lbs. per sq. inch, respectively, the pressure upon the discharge and inlet sides of the motor will respectively correspond. Thus the pressure in the balance chamber will now be 320 lbs. per sq. inch and this will produce a resultant force of 1200 lbs. tending to open the valve. As a result the valve member will be lifted off its seating to place the feed pump discharge in communication with the boiler inlet.

It will be observed that in either of the two extreme conditions described in the foregoing, the pressures in the balance chamber may be different, i. e. they will rise or fall to accommodate the position of the valve member to allow the appropriate quantity of feed water to pass into the boiler to keep the boiler water level at the prescribed level. Also the resultant forces acting on the valve are excessive but, for the proportions chosen to illustrate the working of the device, this provides a margin for leakages through the motor and pump which, to avoid unnecessary complexities in calculation, have been neglected.

I claim:

1. A feed water regulator valve mechanism for steam boilers, comprising a valve casing defining a valve chamber and a balance chamber, a feed water inlet passageway opening into said valve chamber, a feed water outlet passageway leading from said valve chamber for delivery of feed water to the boiler, a movable valve member in the valve chamber for controlling the flow of feed water from said inlet passageway to the valve chamber, said valve member being subject to the pressure of the feed water supply in said feed water inlet passageway and to an opposing pressure in the balance chamber, and pump means operable to vary the said pressure in the balance chamber in dependence upon the water level in the boiler for in turn determining the disposition of the valve member with respect to the feed water inlet passageway.

2. A feed water regulator valve mechanism as claimed in claim 1, in which the pump means comprises means defining two separate compartments and a motor and a gear pump in driving connection coaxially mounted respectively in said compartments, the motor and gear pump each having fluid intake and discharge sides, a conduit connecting the feed water passageway with the intake side of the motor for supplying feed water under pressure for driving said motor, a restricted flow passageway connecting said intake side of said motor with the balance chamber for conducting feed water under the pressure of the said intake side to the balance chamber, a feed water discharge passageway connected into the discharge side of said motor, a passageway connected into the discharge side of the gear pump for discharging the fluid delivered by said gear pump, and an inlet passageway connected into the intake side of said gear pump for supplying fluid from the steam boiler at its normal liquid working level, whereby the rate of rotation of said motor and pump and the pressure on the intake side of said motor and in the balance chamber are automatically varied in dependence upon the delivery of water or steam from the boiler to the intake side of said pump through the inlet passageway connected thereinto.

3. A feed water regulator valve mechanism as claimed in claim 2, further including an adjustable valve in the conduit connecting the feed water passageway with the intake side of said motor for regulating the rate of flow of feed water therethrough, the rate of rotation of said motor and pump and the pressure in the balance chamber.

4. A feed water regulator valve mechanism as claimed in claim 3, in which the feed water discharge passageway connected into the discharge side of said motor is connected into the valve chamber.

5. A feed water regulator valve mechanism for steam boilers as claimed in claim 1, in which the movable valve member is provided with a head for controlling the inlet opening into the valve chamber and a coaxial opposed piston working in the balance chamber, the face of the piston in the balance chamber being of greater diameter than the face of the opposed head controlling the inlet opening to the valve chamber, the dimensioning of the valve member being such that when the pressure in the balance chamber approaches the discharge pressure of the feed water, the valve member will tend to close the inlet opening and when the pressure in the balance chamber approaches the boiler pressure, the valve member will tend to move away from the feed water inlet opening to the valve chamber.

6. A feed water regulator valve mechanism as claimed in claim 1, in which the pump means comprises means defining two separate compartments and a fluid-operated motor means and gear pump in driving connection mounted respectively in said compartments, the motor means and gear pump having fluid intake and discharge sides, a conduit connecting the feed water passageway with the intake side of the motor means for supplying feed water under pressure for operating the motor means and driving the gear pump, a restricted flow passageway connecting the intake side of said motor means with the balance chamber for conducting feed water under the pressure of the intake side of the motor means to the balance chamber, a feed water discharge passageway connected into the discharge side of the motor means, an inlet passageway connected into the intake side of the gear pump for supplying fluid thereto from the steam boiler at the normal liquid working level of the boiler, and a passageway connected into the discharge side of the gear pump for discharging the fluid delivered by the gear pump.

7. A feed water regulator valve mechanism as claimed in claim 6, including an adjustable valve disposed in the conduit connecting the feed water passageway with the intake side of the motor means for regulating the rate of flow of feed water for driving the motor means and gear pump, thereby regulating the rate of rotation of the motor means and gear pump and also the pressure in the inlet side of the motor means and balance chamber.

8. In a feed water supply regulator valve mechanism for steam boilers including a valve casing defining a valve chamber and a balance chamber, a feed water inlet passageway opening into said valve chamber, a feed water outlet passageway leading from said valve chamber for delivery of feed water to the boiler, an axially displaceable valve member having a head for controlling the flow of feed water from said opening of the inlet passageway to the valve chamber and a coaxially opposed piston working in the balance chamber, said piston being subject to the pressure in the balance chamber, and conduit means for delivering a pressure fluid to the balance chamber, the improvement comprising a pump means operable to vary the pressure of the fluid in the balance chamber in dependence upon the water level in the boiler for in turn determining the axial disposition of the valve member with respect to the opening of the feed water inlet passageway.

9. A feed water supply regulator valve mechanism as claimed in claim 8, in which said conduit means is connected into the feed water inlet passageway for receiving feed water under pressure therefrom.

10. A feed water supply regulator valve mechanism as claimed in claim 9, including fluid operable motor means connected up for driving the pump means, said conduit means being connected into said motor means for delivering feed water under pressure thereto to effect its operation.

11. A feed water regulator valve mechanism for steam boilers, comprising a valve casing defining a valve chamber and a balance chamber, a feed water inlet passageway adapted to receive feed water under pressure from a feed water pump and opening into said valve chamber, a feed water outlet passageway leading from said valve chamber for discharge of feed water to be delivered into the boiler, a movable valve means including portions respectively operable in the valve chamber and balance chamber for controlling the flow of feed water from the opening of the inlet passageway to the valve chamber, said valve means being subject to the pressure of the feed water supply in said feed water inlet passageway and to an opposing fluid pressure in the balance chamber, conduit means adapted to receive feed water under pressure from the feed water pump and deliver feed water under pressure into the balance chamber, an adjustable valve in said conduit means for varying the rate of flow therein, and means adapted to operate in response to predetermined changes in water level in the boiler with respect to a normal working level for varying the water pressure in the balance chamber, thereby determining the rate of feed water supply to the valve chamber through the feed water inlet passageway.

References Cited in the file of this patent
UNITED STATES PATENTS
850,045   Ogden _____ Apr. 9, 1907